E. W. REID.
WAGON.
APPLICATION FILED APR. 5, 1916.

1,283,898.

Patented Nov. 5, 1918.

Inventor
EDWARD W. REID

Witness
Emma B. Weaver

By Charles E. Weaver
Attorney

UNITED STATES PATENT OFFICE.

EDWARD W. REID, OF DETROIT, MICHIGAN.

WAGON.

1,283,898.　　　　　Specification of Letters Patent.　　Patented Nov. 5, 1918.

Application filed April 5, 1916. Serial No. 88,980.

*To all whom it may concern:*

Be it known that I, EDWARD W. REID, a citizen of the United States, residing at Detroit, county of Wayne, State of Michigan, have invented a certain new and useful Improvement in Wagons, and declare the following to be a full, clear, and exact description of the same, such as will enable others skilled in the art to which it pertains to make and use the same, reference being had to the accompanying drawings, which form a part of this specification.

This invention relates to wagons and its object is a wagon having side boards foldable relative to the wagon bed and each of which are formed of two or more members extending longitudinally of the bed and relatively foldable. A further object is a wagon having foldable side boards to each end of which substantially half the end board is secured forming a box when folded relative to the wagon bed, with the outer hinged portions of the side boards occupying a horizontal position.

The wagon is particularly adapted for use with a tent and may occupy the entire, or part of the, area of the tent and, when the side boards are turned to horizontal position, provides a floor above the ground enabling the occupants to set up a tent in any available space without necessity of preparation of a camping site. The wagon may be used as a trailer for an automobile if so desired and when so used a single truck is provided on which the wagon bed is mounted. These several objects and the general novel features of the construction of the invention are hereinafter more fully described and claimed and shown in the accompanying drawings in which—

Similar characters refer to similar parts throughout the drawing and specification.

Figure 1:
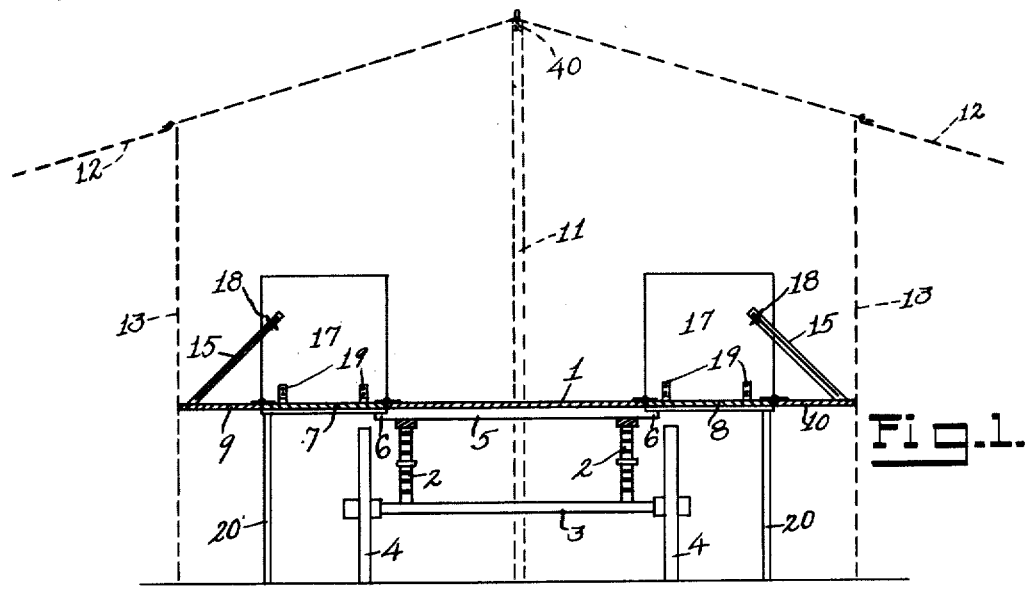
Figure 1 is a cross-section of a wagon embodying my invention indicating a tent erected thereover.
Figure 2:
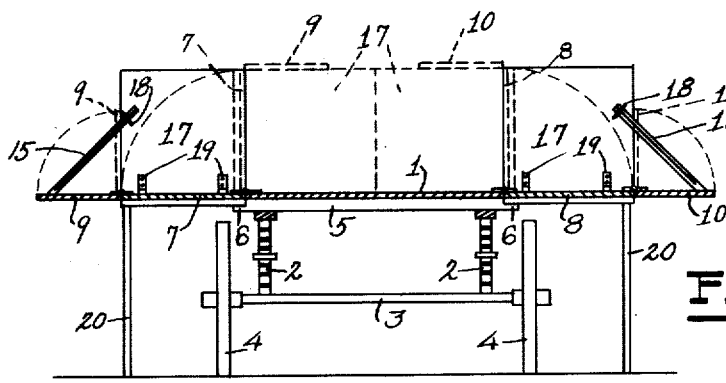
Fig. 2 is a similar section of the wagon showing the parts in the several relations in which they may be folded.
Figure 3:
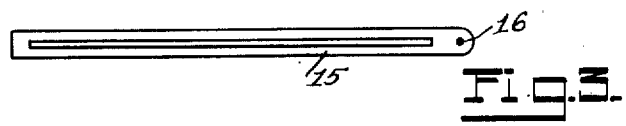
Fig. 3 is a detail of a support for the outer hinged portion of the side board.

As shown in Fig. 1, the wagon bed 1 is mounted on springs 2, 2, which in turn are mounted on the axle 3 supported by the wheels 4. The bed 1 may be of any approved construction having a floor supported by the cross members 5 somewhat greater in length than the width of the floor and notched at the end as indicated at 6. To each longitudinal side of the wagon bed 1 are hinged the side boards 7 and 8 and the end 6 of the cross-members 5 forms a support for the inner hinged edge of the side boards when turned to horizontal position as shown in Fig. 1. Each side board has an additional member 9 and 10 respectively hinged to the outer longitudinal edge thereof as may be understood from Fig. 1, which, when extended as shown in said Fig. 1, forms with the portions 7 and 8 and the wagon bed a floor of considerable width adaptable for use as the floor of a tent. The tent may be erected over the wagon as is indicated by the dotted lines in Fig. 1, having a central upright pole 11 at each end thereof and ridge bar 40 as is usual with tent structures. The ordinary guy ropes 12 are utilized to support the tent and the vertical side walls 13 of the tent extend along the edge of the members 9 and 10 of the side boards of the wagon to which the tent walls may be secured, if desired, by the usual carriage buttons (not here shown). It is to be understood that the tent may be of any desired size. That is, it may only cover an area equal to that of the floor formed by the wagon bed and side boards when in the extended relation, or the tent may be much longer than the wagon, the wagon then occupying only one end thereof. In such case the wagon bed or floor occupies one end of the tent and may be used as a sleeping compartment in which beds may be placed and the occupants thus kept out of contact with damp ground. Each of the extensions 9 and 10 of the side boards has a slotted supporting bar 15 pivotally mounted at each end thereof and at the outer edge. The bar as shown in detail in Fig. 3 is apertured at 16 to receive a bolt secured in the end of the board 9 or 10 as the case may be. As may be understood from Fig. 1, a bolt is provided on the end board 17 in each instance engaging in the slot in the supporting bar and provided with a winged nut 18 to hold the same in place. These end boards 17 are secured to each end of the portion 7 and 8 of the side board and when the side boards are folded to upright position, as indicated by dotted lines in Fig. 2, the end boards are brought to horizontal position with the ends thereof in engagement at the center forming with the side boards a box for carrying the tent paraphernalia. When the side boards are turned to upright position the extensions 9 and 10 extend over the bed forming a partial cover therefor and by increasing the width of the hinged portions 9 and 10 may form a closed box as will readily be understood. The side members 9 and 10 may be turned to upright position when the portions 7 and 8 are in horizontal position as is also shown by dotted lines in Fig. 2, being held in such position by the thumb nut and bar 15. The end boards 17 may be secured to the portions 7 and 8 in any approved manner preferably with the brackets 19 of sufficient strength to withstand the strains to which the boards are subjected when in the position shown in Fig. 1. When the parts are extended as shown in said Fig. 1, supporting poles 20 are provided at each end of the boards 7 and 8, thus supporting the free edges of the said boards, the inner edges of which are held by the hinges and extensions 6 of the cross bars.

From the foregoing description it becomes evident that the wagon is of simple and comparatively inexpensive construction and adapted to be folded to box like form for the transportation of tent paraphernalia or the like, and very readily folded to horizontal position with the wagon bed to form a floor of considerable width on which beds and other paraphernalia required for camp use may be deposited and providing a floor remote from the ground. With this wagon, the camper may provide a camp site without necessity of preparing the surface of the ground for camping, avoiding the necessity of building of trenches or the like to prevent an accumulation of water within the tent, or necessity of leveling the ground for the purpose of providing a tent floor.

Having thus briefly described my invention, and its utility, what I claim and desire to secure by Letters Patent of the United States is—

1. In a wagon or the like, a wagon bed, side boards hinged to each longitudinal side of the bed, end members fixed at a right angle to each end of each side board forming end boards for the wagon bed when the side boards are turned to upright position, and extensions hinged to each outer edge of each side board and a bracket at each end of each extension connected with the outer edge of the extension and with the end members of the companion side board to support the extension in extended relation, the side boards and extensions being adapted to be folded to occupy a horizontal plane with the wagon bed to form a floor or to upright position in a manner to form a box therewith.

2. In a wagon or the like, a wagon bed, side boards hinged at each longitudinal side thereof, cross members for the bed extending outward therefrom providing a support at the hinged edge of the side board when turned to occupy a plane with the bed, end members secured substantially at a right angle to each end of each side board forming end boards for the wagon bed when the side boards are turned to upright position, extensions hinged to each outer longitudinal edge of the side boards and adapted to be turned to horizontal relation therewith or at a right angle thereto, means for securing said extensions in either position, the side boards and extensions being adapted to be folded to occupy a horizontal plane with the wagon bed or to upright position to form a box, the extensions being folded thereover parallel with the wagon bed.

3. In a wagon or the like, a wagon bed, side boards hinged to each longitudinal side thereof, end members secured at a right angle to each end of each side board forming end boards for the wagon bed when the side boards are turned to upright position, extensions hinged to each outer side of the side boards, a support for each end of each extension, the support being secured to each end member of a side board and adapted to allow the extension to be turned to a horizontal plane with the side board or at a right angle thereto, the side boards and extensions being adapted to be folded to occupy a horizontal plane with the wagon bed or to upright position to form a box.

4. In combination, a wagon or the like mounted on wheels and having side members adapted to be folded to occupy a horizontal plane with the bed of the wagon to provide an unobstructed floor, and a tent structure erectable on the wagon bed having side walls attachable to the side members when extended and adapted to inclose the said bed and extend beneath the floor to the ground line.

5. In a wagon or the like, a wagon bed or bottom, side boards formed of two hinged parts, said boards being hinged to the wagon bed upon each longitudinal side thereof and adapted to be unfolded to a horizontal plane with the said bed, cross members extending beneath the wagon bed or bottom and projecting on each side thereof providing a support for the edge of the side boards hinged thereto, means for supporting the said side boards intermediate the width thereof, means for supporting the outer edge when in extended relation, the said side boards being foldable over the said bottom to form a box therewith, and a knock-down tent construction erectable over the said wagon bottom and side members.

6. In a camping wagon, a wagon bed or bottom, side members pivotally secured to each longitudinal side thereof adapted to be secured in an upright position or in a plane therewith to provide a floor, end boards attached to each end of each side member adapted to form end boards for the box provided by folding the side members to upright position, and auxiliary side members hingedly secured to each outer longitudinal side of the said side members adapted to be unfolded to lie in a plane with the side members and floor of the structure or to fold over and lie upon the end members when the longitudinal side members are turned to upright position.

7. In a camping wagon, a wagon bed or bottom, side members pivotally secured to each longitudinal side thereof, auxiliary side members pivotally secured to each outer longitudinal edge of the said side members, the said side members and auxiliary members being adapted to be folded over the wagon bed providing a box like structure, the said side members each having an end piece attached thereto at a right angle providing an end board for the box like body, and braces at each end of each auxiliary member connecting each end thereof with each end board of each side member for supporting the same in a horizontal plane with the wagon bed and side members.

In testimony whereof, I sign this specification.

EDWARD W. REID.

Copies of this patent may be obtained for five cents each, by addressing the "Commissioner of Patents, Washington, D. C."